US011536435B2

(12) United States Patent
Jin et al.

(10) Patent No.: US 11,536,435 B2
(45) Date of Patent: Dec. 27, 2022

(54) LIGHT HOMOGENIZING FILM, BACKLIGHT MODULE AND DISPLAY DEVICE

(71) Applicant: BOE TECHNOLOGY GROUP CO., LTD., Beijing (CN)

(72) Inventors: Liangliang Jin, Beijing (CN); Zezhou Yang, Beijing (CN); Shubai Zhang, Beijing (CN); Ruoyu Ma, Beijing (CN); Jian Sang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/332,749

(22) Filed: May 27, 2021

(65) Prior Publication Data

US 2021/0404628 A1 Dec. 30, 2021

(30) Foreign Application Priority Data

Jun. 30, 2020 (CN) .......................... 202010614984.8

(51) Int. Cl.
*F21V 3/04* (2018.01)
*G02B 5/02* (2006.01)
(Continued)

(52) U.S. Cl.
CPC ............ *F21V 3/049* (2013.01); *G02B 5/0215* (2013.01); *G02B 5/0231* (2013.01);
(Continued)

(58) Field of Classification Search
CPC .............. F21V 3/049; G02F 1/133607; G02F 1/133611; G02F 1/133606;
(Continued)

(56) References Cited

U.S. PATENT DOCUMENTS 3,764,800 A 10/1973 Clostermann
2002/0145860 A1 10/2002 Lee
(Continued)

FOREIGN PATENT DOCUMENTS

CN 102042562 A 5/2011
CN 107966856 A * 4/2018
(Continued)

OTHER PUBLICATIONS

China Patent Office, CN202010614984.8 First Office Action (OA1) dated Oct. 29, 2021.

*Primary Examiner* — Erin Kryukova
(74) *Attorney, Agent, or Firm* — Houtteman Law LLC

(57) ABSTRACT

The present disclosure provides a light homogenizing film, a backlight module and a display device. The light homogenizing film includes a substrate film layer on which a plurality of light homogenizing structures are arranged in an array. The light homogenizing structure includes: a first recess in a regular pyramid shape positioned on a light incident surface of the substrate film layer, and a second recess in a regular pyramid shape positioned on a light emitting surface of the substrate film layer. On a plane where a main body of the substrate film layer is located, an orthographic projection of the second recess completely covers an orthographic projection of the first recess, and the orthographic projections of the first and second recesses are regular polygons which have overlapped centers, the same number of sides and the same orientation.

11 Claims, 12 Drawing Sheets

(51) Int. Cl.
*G02F 1/1335* (2006.01)
*G02F 1/13357* (2006.01)

(52) U.S. Cl.
CPC ..... *G02B 5/0278* (2013.01); *G02F 1/133607* (2021.01); *G02F 1/133611* (2013.01)

(58) Field of Classification Search
CPC ............ G02F 1/133609; G02B 5/0215; G02B 5/0231; G02B 5/0278; G02B 5/0263; G02B 6/0016; G02B 6/018; G02B 6/002
See application file for complete search history.

(56) References Cited

U.S. PATENT DOCUMENTS

| | | | | |
|---|---|---|---|---|
| 2011/0090672 | A1* | 4/2011 | Zhu | G02F 1/133611 |
| | | | | 362/350 |
| 2011/0249214 | A1* | 10/2011 | Cheong | G02B 6/002 |
| | | | | 349/61 |
| 2019/0049649 | A1* | 2/2019 | Hayashi | G02F 1/133606 |
| 2020/0105973 | A1* | 4/2020 | Kasai | G02F 1/133603 |
| 2020/0341183 | A1* | 10/2020 | Yonemoto | G02B 6/0061 |

FOREIGN PATENT DOCUMENTS

| | | |
|---|---|---|
| CN | 109844625 A | 6/2019 |
| CN | 110161758 A | 8/2019 |
| WO | WO-2018116815 A1 * 6/2018 | ................ F21S 2/00 |

\* cited by examiner (a)  (b)

(a) (b)

LIGHT HOMOGENIZING FILM, BACKLIGHT MODULE AND DISPLAY DEVICE

CROSS-REFERENCE TO RELATED APPLICATION

This application claims priority from Chinese patent application No. 202010614984.8 filed on Jun. 30, 2020, the disclosure of which is incorporated herein by reference.

TECHNICAL FIELD

The present disclosure relates to the field of display technology, and in particular relates to a light homogenizing film, a backlight module and a display device.

BACKGROUND

In the current research field of liquid crystal display panels, the LED backlight technology is helpful to improve the color effect and contrast of the display panels, and due to the continuous reduction of processing costs, LEDs will have a great market prospect in the future. LEDs in a backlight are arranged in an array, and there is a certain distance between two adjacent LEDs. Since LEDs emit light that is similar to Lambert light, changes in the radiation intensity along with the angle between an observation direction and a normal of a surface light source follow the Cosine law. Namely, the smaller the angle between the observation direction and the normal of the surface light source is, the stronger the radiation intensity will be. In actual observations, a region with an LED is brighter, while a region without an LED is darker. As a result, problems such as lamp shadow, halo and the like are easy to occur after the light emitted from the LED passes through a diffusion film.

SUMMARY

To solve at least one of the problems in the related art, embodiments of the present disclosure provide a light homogenizing film, a backlight module and a display device.

In a first aspect, the embodiments of the present disclosure provide a light homogenizing film, including:

a substrate film layer on which a plurality of light homogenizing structures are arranged in an array, each of the plurality of light homogenizing structures including:

a first recess positioned on a light incident surface of the substrate film layer, and a second recess positioned on a light emitting surface of the substrate film layer opposite to the light incident surface, wherein the first recess and the second recess each have a regular pyramid shape, an orthographic projection of the second recess on a plane where a main body of the substrate film layer is located completely covers an orthographic projection of the first recess on the plane where the main body of the substrate film layer is located, the orthographic projection of the first recess on the plane where the main body of the substrate film layer is located has a contour of a first regular polygon, the orthographic projection of the second recess on the plane where the main body of the substrate film layer is located has a contour of a second regular polygon, the first regular polygon and the second regular polygon have the same number of sides, a center of the first regular polygon coincides with a center of the second regular polygon, and any point on the first regular polygon has the same minimum distance to the second regular polygon.

In some embodiments, a side surface and a bottom surface of the regular pyramid corresponding to the first recess form an angle $\alpha$, a side surface and a bottom surface of the regular pyramid corresponding to the second recess form an angle $\beta$, and $\alpha$ and $\beta$ satisfy:

$$\begin{cases} \alpha + \beta - \arcsin\dfrac{\sin(\theta 1 + \alpha)}{n} > \arcsin\dfrac{1}{n} \\ \pi - \alpha - 2\beta + \arcsin\dfrac{\sin(\theta 1 + \alpha)}{n} > \arcsin\dfrac{1}{n} \end{cases}$$

wherein n is a refractive index of the substrate film layer, $\theta 1$ is a preset dimming angle, and $0° \leq \theta 1 \leq 30°$.

In some embodiments, the first regular polygon has a side length a1, the second regular polygon has a side length a2, and a1 and a2 satisfy:

$$\frac{1}{3} \leq \frac{a1}{a2} \leq 1.$$

In some embodiments, the regular pyramid shape includes: a regular triangular pyramid, a square pyramid, or a regular hexagonal pyramid.

In some embodiments, the regular pyramid shape is a regular triangular pyramid or a regular hexagonal pyramid; and for any one light homogenizing structure among the plurality of light homogenizing structures except those located at the outermost sides of the light homogenizing film, six light homogenizing structures, which are adjacent and nearest to the one light homogenizing structure, are present around the one light homogenizing structure and arranged in a regular hexagon shape taking the one light homogenizing structure as a center.

In some embodiments, the regular pyramid shape is a square pyramid; and for any one light homogenizing structure among the plurality of light homogenizing structures except those located at the outermost sides of the light homogenizing film, four light homogenizing structures, which are adjacent and nearest to the one light homogenizing structure, are present around the one light homogenizing structure and arranged in a square shape taking the one light homogenizing structure as a center.

In some embodiments, a material of the substrate film includes at least one selected from a group consisting of: polycarbonate, polyethylene terephthalate, polymethyl methacrylate, and glass.

In a second aspect, the embodiments of the present disclosure further provide A backlight module, including the above light homogenizing film.

In some embodiments, the backlight module further includes a backlight, wherein the backlight includes a plurality of light emitting elements arranged in an array, each of the plurality of light emitting elements corresponding to a different first recess and having a light emitting surface facing the corresponding first recess.

In some embodiments, the regular pyramid shape is a square pyramid, the orthographic projection of the first recess on the plane where the main body of the substrate film layer is located has a contour of a first square;

an orthographic projection of the light emitting surface of the light emitting element on the plane where the main body of the substrate film layer is located has a contour of a third square, wherein a center of the third square coincides with a center of the first square; and a diagonal of the third square forms an angle of 45° with a diagonal of the first square.

In some embodiments, the regular pyramid shape is a square pyramid, the orthographic projection of the first recess on the plane where the main body of the substrate film layer is located has a contour of a first square, an orthographic projection of the light emitting surface of the light emitting element on the plane where the main body of the substrate film layer is located has a contour of a third square, wherein a center of the third square coincides with a center of the first square;

for any one light emitting element among the plurality of light emitting elements except those located at the outermost sides of the backlight, four light emitting elements, which are adjacent and nearest to the one light emitting element, are present around the one light emitting element, and arranged in a square shape taking the one light emitting element as a center;

for any one light homogenizing structure among the plurality of light homogenizing structures except those located at the outermost sides of the light homogenizing film, four light homogenizing structures, which are adjacent and nearest to the one light homogenizing structure, are present around the one light homogenizing structure, and arranged in a square shape taking the one light homogenizing structure as a center; and when a distance between two adjacent and nearest light emitting elements is P, a distance between two adjacent and nearest light homogenizing structures is P, $$\frac{\sqrt{2}}{2}P \text{ or } \frac{\sqrt{2}}{4}P.$$

In some embodiments, the backlight module further includes at least one of a diffusion film, a quantum dot film and a prism film positioned on the light emitting surface side of the light homogenizing film.

In a third aspect, the embodiments of the present disclosure further provide a display device including the above backlight module.

BRIEF DESCRIPTION OF THE DRAWINGS

The accompanying drawings, which serve to provide a further understanding of the present disclosure and constitute a part of this specification, are used to explain the present disclosure together with the following embodiments, but do not constitute a limitation of the present disclosure. In the drawings:

FIG. 12c is a light intensity distribution simulation diagram when light emitted from nine light emitting elements passes through the light homogenizing film shown in FIG. 12a;

FIG. 13b is a light intensity distribution simulation diagram when light emitted from seven light emitting elements passes through the light homogenizing film shown in FIG. 13a;

FIG. 14b is a light intensity distribution simulation diagram when light emitted from seven light emitting elements passes through the light homogenizing film shown in FIG. 14a;

DETAILED DESCRIPTION

To improve understanding of the technical solution of the present disclosure for those skilled in the art, the light homogenizing film, the backlight module and the display device provided in the disclosure will be described below in detail in conjunction with the accompanying drawings.

The terms "first" and "second," and the like in the description and the claims of the present disclosure, are used for distinguishing similar elements and are not necessarily for describing a particular sequential or chronological order. Furthermore, the spatial orientation terms "above," "below," and the like in the description and the claims of the present disclosure are intended to be illustrative rather than restrictive.

Figure 1:
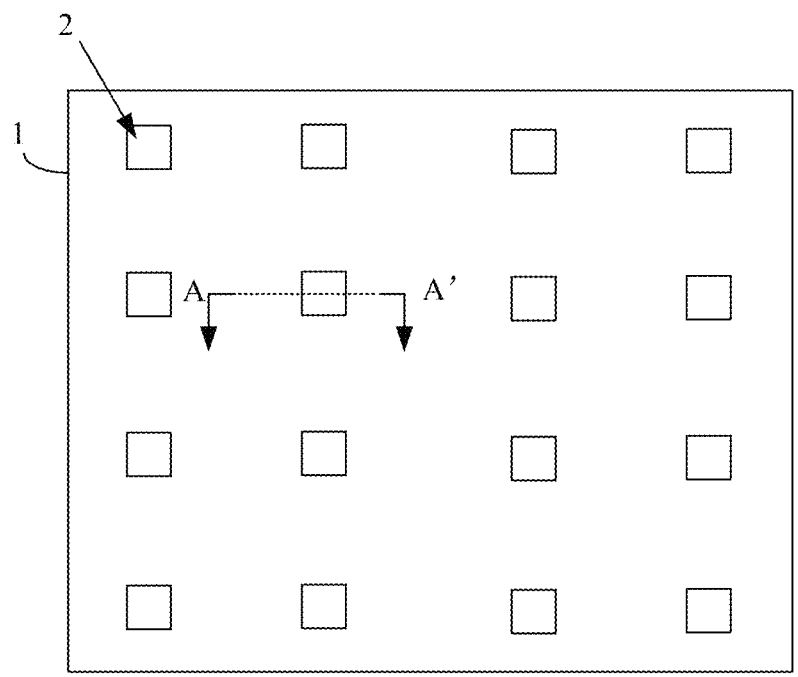
FIG. 1 is a schematic top view of a light homogenizing film according to an embodiment of the present disclosure.
Figure 2:
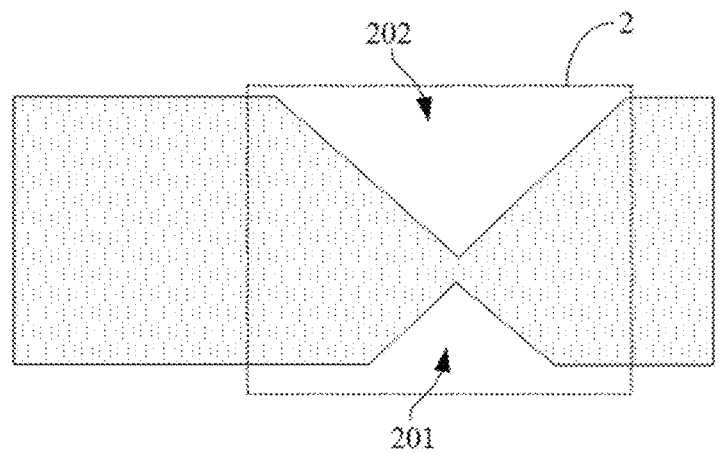
FIG. 2 is a schematic cross-sectional view taken along line A-A' of FIG. 1.
Figure 3:
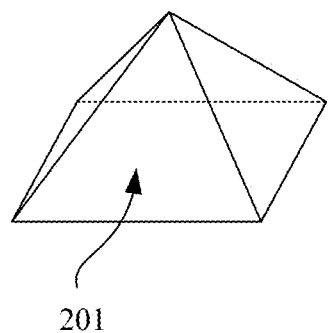
FIG. 3 is a schematic structural view of a first recess according to an embodiment of the present disclosure.
Figure 4:
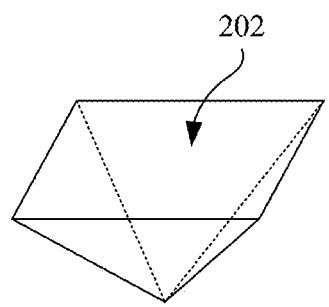
FIG. 4 is a schematic structural view of a second recess according to an embodiment of the present disclosure.

FIG. 1 is a schematic top view of a light homogenizing film provided in an embodiment of the present disclosure, FIG. 2 is a schematic cross-sectional view taken along line A-A' of FIG. 1, FIG. 3 is a schematic structural view of the first recess 201 in FIG. 2, and FIG. 4 is a schematic structural view of the second recess 202 in FIG. 2. As shown in FIGS. 1 to 4, in an embodiment the present disclosure, there is provided a light homogenizing film, the light homogenizing film including: a substrate film layer 1 on which a plurality of light homogenizing structures 2 are arranged in an array. Each light homogenizing structure 2 includes: a first recess 201 positioned on a light incident surface of the substrate film layer 1 (the lower surface of the substrate film layer 1 shown in FIG. 2), and a second recess 202 positioned on a light emitting surface of the substrate film layer 1. In a thickness direction (the vertical direction in FIG. 2) of the substrate film layer 1, the light incident surface and the light emitting surface are disposed opposite to each other. In some embodiments, the light incident surface and the light emitting surface are parallel to each other and are both parallel to a plane where a main body of the substrate film layer 1 is located. The first recess 201 and the second recess 202 each have a regular pyramid shape. An orthographic projection of the second recess 202 on the plane where the main body of the substrate film layer 1 is located completely covers an orthographic projection of the first recess 201 on the plane where the main body of the substrate film layer 1 is located. The orthographic projection of the first recess 201 on the plane where the main body of the substrate film layer 1 is located has a contour of a first regular polygon, the orthographic projection of the second recess 202 on the plane where the main body of the substrate film layer 1 is located has a contour of a second regular polygon, and a center of the first regular polygon coincides with a center of the second regular polygon. The first regular polygon and the second regular polygon have the same number of sides (4 in this embodiment). In other words, the first recess 201 and the second recess 202 each have a regular N-pyramid shaped, wherein n is an integer greater than or equal to 3. Any point on the first regular polygon has the same minimum distance to the second regular polygon. In other words, the first regular polygon and the second regular polygon have the same orientation. That is, each corner of the first regular polygon points to the same direction as the corresponding corner of the second regular polygon.

In the description and the claims of the present disclosure, the main body of the substrate film layer 1 refers to a middle portion of the substrate film layer in the thickness direction (for example, a portion between the first recess 201 and the second recess 202 in the thickness direction), said portion being located in a plane perpendicular to the thickness direction of the substrate film layer 1. The plane where the main body of the substrate film layer is located refers to a plane where an entirety of the main body of the substrate film layer is located, or a plane perpendicular to the thickness direction of the substrate film layer at the light homogenizing structure.

When the light homogenizing film provided in the embodiment of the present disclosure is used in combination with a backlight 4, light emitted from each light emitting element of the backlight 4 can be homogenized, so as to reduce or even eliminate problems such as lamp shadow and halo. The principle of the light homogenizing film provided in the embodiments of the present disclosure will be described in detail below with reference to specific examples.

In some embodiments, the substrate film layer 1 includes at least one material selected from a group consisting of: polycarbonate (PC), polyethylene terephthalate (PET), polymethyl methacrylate (PMMA), and glass.

In some embodiments, the light homogenizing film has a thickness of 10 µm to 1000 µm. A sum of depths of the first recess and the depth of the second recess (i.e., a sum of a height of the regular pyramid corresponding to the first recess and a height of the regular pyramid corresponding to the second recess) is smaller than the thickness of the light homogenizing film.

In some embodiments, the light homogenizing film may further include a light-transmissive material having a refractive index smaller than that of the substrate film layer, filled in the first recess and/or the second recess of each light homogenizing structure. In addition, the light-transmissive material may be further formed into a light-transmissive film layer tightly affixed to the light incident surface and/or the light emitting surface of the substrate film layer.

In an embodiment of the present disclosure, the light emitting elements in the backlight 4 may be light emitting devices such as mini-LEDs and micro-LEDs.

In some embodiments, the first regular polygon has a side length a1, the second regular polygon has a side length a2, and a size ratio of the first recess 201 to the second recess 202 is defined as $$\frac{a1}{a2},$$

which satisfies:

$$\frac{1}{3} \leq \frac{a1}{a2} \leq 1.$$

Figure 5:
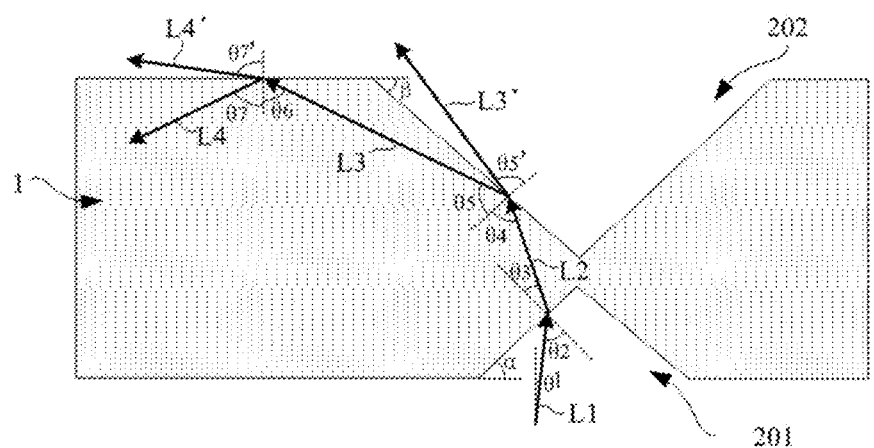
FIG. 5 is a schematic view showing an optical path of small-angle incident light incident into the light homogenizing film according to an embodiment of the present disclosure.

FIG. 5 is a schematic view showing an optical path of small-angle incident light incident into the light homogenizing film according to an embodiment of the present disclosure. As shown in FIG. 5, the "small-angle incident light" refers to incident light that forms a small angle with a normal of the plane where the light incident surface is located. In some embodiments, the angle is less than or equal to 30°. A side surface and a bottom surface of the regular pyramid corresponding to the first recess 201 form an angle α, and a side surface and a bottom surface of the regular pyramid corresponding to the second recess 202 form an angle β. Exemplary description will be given below by taking an angle θ1 between an incident light beam L1 and the normal of the plane where the light incident surface is located.

The incident light beam L1 forms an incident angle θ2 with a side surface of the first recess 201, and generates a refracted light beam L2 after being refracted by the side surface of the first recess 201, wherein the refraction angle is θ3.

The refracted light beam L2 is emitted to a side surface of the second recess 202, and forms an incident angle θ4 with the side surface of the second recess 202. If the refracted light beam L2 is totally reflected at the side surface of the second recess 202, only a reflected light beam L3 is formed with a reflection angle θ5. If the refracted light beam L2 is not only reflected but also refracted at the side surface of the second recess 202, not only the reflected light beam L3, but also a refracted light beam L3', are formed, wherein the refraction angle is θ5' (θ5'>θ4).

The reflected light beam L3 is emitted to the light emitting surface, and forms an incident angle θ6 with the light emitting surface. If the reflected light beam L3 is totally reflected at the light emitting surface, only a reflected light beam L4 is formed. If the reflected light beam L3 is not only reflected but also refracted at the light emitting surface, not only the reflected light beam L4, but also a refracted light beam L4', are formed, wherein the refraction angle is θ7' (θ7'>θ6).

As can be seen from the above, after being refracted at the side surface of the first recess 201, reflected at the side surface of the second recess 202, and reflected at the light emitting surface, at least part of the light beam L1 does not exit the light emitting surface. Therefore, the light homogenizing structure 2 in the embodiment of the present disclosure can effectively reduce a light emitting intensity of the small-angle incident light, serving a function of light homogenization.

Figure 6:
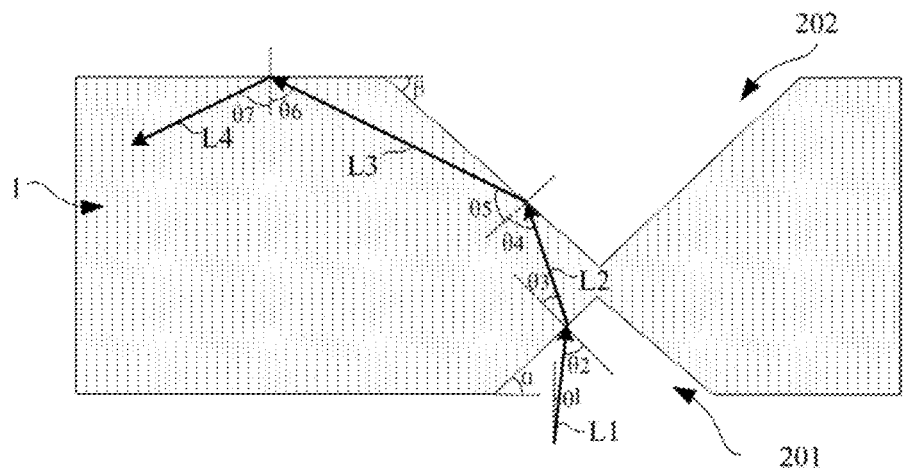
FIG. 6 is a schematic view showing another optical path of small-angle incident light into the light homogenizing film according to an embodiment of the present disclosure.

FIG. 6 is a schematic view showing another optical path of small-angle incident light into the light homogenizing film according to an embodiment of the present disclosure. As shown in FIG. 6, in some embodiments, by configuring angles α, β, and refractive index n of the substrate film layer 1, the incident light, having an angle smaller than or equal to θ1 with the normal of the plane where the light incident surface of the light homogenizing film is located, cannot be emitted from the side surfaces and the light emitting surface of the second recess 202 after entering the first recess 201. That is, the light beam is totally reflected at the side surface of the second recess 202, and totally reflected at the light emitting surface (i.e., the light beam L3' and the refracted light beam L4' as described above are not formed).

Assuming that the media on both sides of the light homogenizing film are air (with a refractive index being about 1), the following relationship can be obtained according to the refraction and reflection laws, as well as the geometrical relationship and angle relationship:

$$\theta 1 + \alpha = \theta 2 \tag{1}$$

$$\sin\theta 2 = n * \sin\theta 3 \tag{2}$$

$$\alpha + \beta - \theta 3 = \theta 4 \tag{3}$$

$$\theta 4 = \theta 5 \tag{4}$$

$$\left(\frac{\pi}{2} - \theta 6\right) + (-\theta 5) = \beta \tag{5}$$

wherein n is the refractive index of the substrate film layer 1.

Based on the above equations (1) to (5), the following can be obtained:

$$\theta 4 = \alpha + \beta - \arcsin \frac{\sin(\theta 1 + \alpha)}{n} \quad (6)$$

$$\theta 6 = \pi - \alpha - 2\beta + \arcsin \frac{\sin(\theta 1 + \alpha)}{n} \quad (7)$$

If total reflection of the light beam L2 is required, θ4 should be greater than or equal to a critical angle at the side surface of the second recess 202. Likewise, if total reflection of the light beam L3 is required, θ6 should be greater than or equal to the critical angle at the side surface of the second recess 202. That is, α and β satisfy:

$$\begin{cases} \alpha + \beta - \arcsin \frac{\sin(\theta 1 + \alpha)}{n} \geq \arcsin \frac{1}{n} \\ \pi - \alpha - 2\beta + \arcsin \frac{\sin(\theta 1 + \alpha)}{n} \geq \arcsin \frac{1}{n} \end{cases}$$

When α and β satisfy the above relationships, the incident light, having an angle smaller than or equal to θ1 (θ1 is a preset dimming angle; in some embodiments, 0°≤θ1≤30°) with the normal of the plane where the light incident surface is located, cannot be emitted from the side surface and the light emitting surface of the second recess 202 after entering the first recess 201. That is, small-angle light emission is effectively restricted, thereby reducing forward light emission from the light emitting elements. Exemplarily, if n=1.49, α=45° and θ1=0°, it is calculated that β>25.5°; if n=1.49, α=45° and θ1=10°, it is calculated that β>30.6°. In some embodiments, a range of θ1 may be determined based on a size of the light emitting element and a distance thereof to the light incident surface, and optimized ranges of α and β may be calculated based on the range of θ1.

In addition, in an embodiment of the present disclosure, the first recess 201 and the second recess 202 have the same regular pyramid shape, which can make light emitted from each light emitting element split into a plurality of light spots from one spot after passing through the light homogenizing structures 2, thereby reducing a distance between the light spots and achieving the purpose of light homogenization. The following detailed description will be given with reference to specific examples.

Referring to FIGS. 3 and 4, in some embodiments, the regular pyramid shape is a square pyramid (regular quadrangular pyramid). Specifically, the first recess 201 is a normal square pyramid, while the second recess 202 is an inverted square pyramid.

Figure 7:
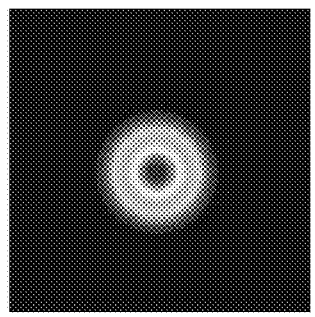
FIG. 7 is a light intensity distribution simulation diagram when light emitted from one light emitting element does not pass through a light homogenizing film.

FIG. 7 is a light intensity distribution simulation diagram when light emitted from one light emitting element does not pass through a light homogenizing film. In the case that a light emitting element (not shown), such as a mini-LED, is placed under an optical film layer which does not include a light homogenizing film, there will be a distinct large light spot above the light emitting element, as shown in FIG. 7. It should be noted that, the light intensity distribution simulation diagram in the drawings of the present disclosure is obtained by performing grayscale conversion on a color light intensity distribution simulation diagram generated by the software "Lighttools". Although changes in the grayscale between adjacent regions reflect changes in the light intensity, the specific brightness value is not represented by the grayscale value. The region corresponding to the large light spot in FIG. 7 is lower in grayscale than the surrounding regions, because it appears red (corresponding to high brightness) in the color light intensity distribution simulation diagram.

Figure 8:
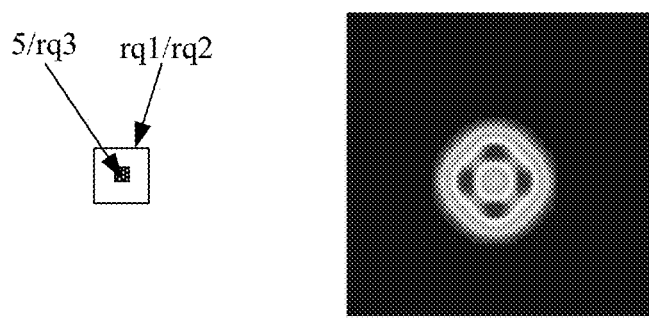
FIG. 8 shows a schematic top view and light intensity distribution simulation diagram when light emitted from one light emitting element passes through the light homogenizing film and the first recess and the second recess both have a square pyramid shape with a size ratio $$\frac{a1}{a2} = 1;$$

FIG. 8 is a schematic top view and light intensity distribution simulation diagram when light emitted from one light emitting element passes through the light homogenizing film and the first recess and the second recess both have a square pyramid shape with a size ratio $$\frac{a1}{a2} = 1.$$

As can be seen from part (a) of FIG. 8, in the case that a light emitting element 5, such as a mini-LED, is placed under the light homogenizing film according to the embodiment of the present disclosure, the orthographic projection of the first recess 201 on the plane where the main body of the substrate film layer is located has a contour of a first square rq1, the orthographic projection of the second recess 202 on the plane where the main body of the substrate film layer is located has a contour of a second square rq2, the first square rq1 and the second square rq2 completely overlap one another, and the light emitting element 5 faces a middle region of the first square rq1. As can be seen from part (b) of FIG. 8, there are four distinct small light spots above the light emitting element 5.

Figure 9:
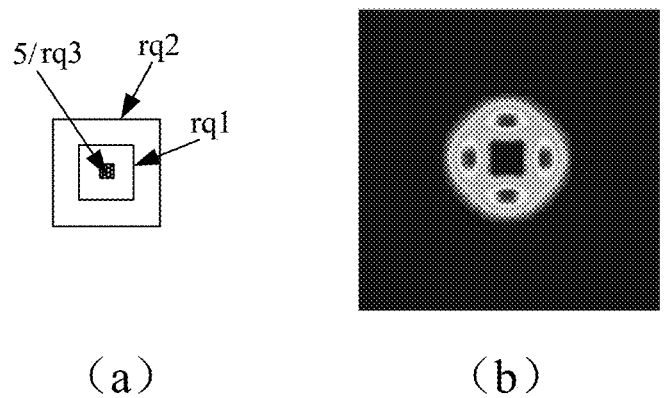
FIG. 9 shows a schematic top view and a light intensity distribution simulation diagram when light emitted from one light emitting element passes through the light homogenizing film and the first recess and the second recess both have a square pyramid shape with a size ratio $$\frac{a1}{a2} = \frac{1}{2};$$

FIG. 9 shows a schematic top view and a light intensity distribution simulation diagram when light emitted from one light emitting element passes through the light homogenizing film and the first recess and the second recess both have a square pyramid shape with a size ratio $$\frac{a1}{a2} = \frac{1}{2}.$$

As can be seen from part (a) of FIG. 9, the orthographic projection of the first recess 201 on the plane where the main body of the substrate film layer is located has a contour of a first square rq1, the orthographic projection of the second recess 202 on the plane where the main body of the substrate film layer is located has a contour of a second square rq2, the center of the first square rq1 coincides with the center of the second square rq2, a ratio of the side length a1 of the first square rq1 to the side length a2 of the second square rq2 is ½, any point on the first square rq1 has a fixed minimum distance to the second square rq2, and the light emitting element 5 faces a middle region of the first square rq1. As can be seen from part (b) of FIG. 9, there are four distinct small light spots (appearing red in the color light intensity distribution simulation diagram) above the light emitting element 5. It should be noted that in part (b) of FIG. 9, the middle black rectangular region has a light intensity of approximately 0, and thus appears the background color. This black rectangular region is not a light spot.

Figure 10:
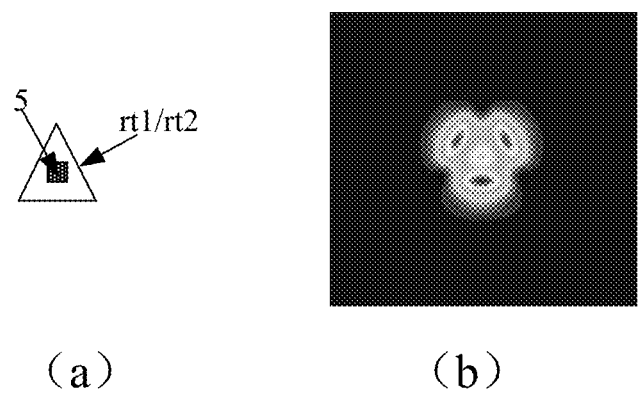
FIG. 10 shows a schematic top view and a light intensity distribution simulation diagram when light emitted from one light emitting element passes through the light homogenizing film and the first recess and the second recess both have a regular triangular pyramid shape with a size ratio $$\frac{a1}{a2} = 1;$$

FIG. 10 shows a schematic top view and a light intensity distribution simulation diagram when light emitted from one light emitting element passes through the light homogenizing film and the first recess and the second recess both have a regular triangular pyramid shape with a size ratio $$\frac{a1}{a2} = 1.$$

As can be seen from part (a) of FIG. 10, the orthographic projection of the first recess 201 on the plane where the main body of the substrate film layer is located has a contour of a first regular triangle rt1, the orthographic projection of the second recess 202 on the plane where the main body of the substrate film layer is located has a contour of a second regular triangle rt2, the first regular triangle rt1 and the second regular triangle rt2 overlap one another, and the light emitting element 5 faces a middle region of the first regular triangle rt1. As can be seen from part (b) of FIG. 10, there are three distinct small light spots above the light emitting element 5.

Figure 11:
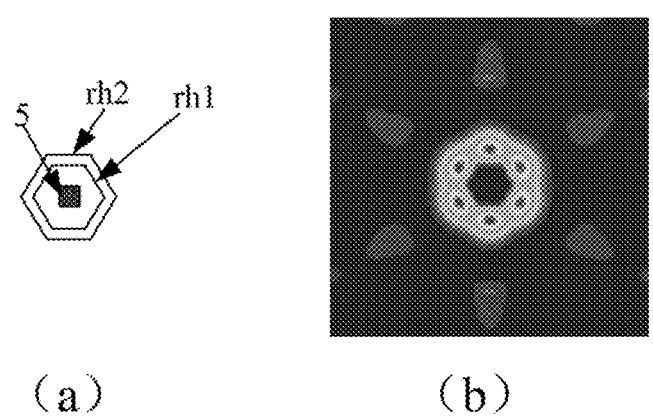
FIG. 11 shows a schematic top view and a light intensity distribution simulation diagram when light emitted from one light emitting element passes through the light homogenizing film and the first recess and the second recess both have a regular hexagonal pyramid shape with a size ratio $$\frac{a1}{a2} = \frac{4}{5};$$

FIG. 11 shows a schematic top view and a light intensity distribution simulation diagram when light emitted from one light emitting element passes through the light homogenizing film and the first recess and the second recess both have a regular hexagonal pyramid shape with a size ratio $$\frac{a1}{a2} = \frac{4}{5}.$$

As shown in FIG. 11, the orthographic projection of the first recess 201 on the plane where the main body of the substrate film layer is located has a contour of a first regular hexagon rh1, the orthographic projection of the second recess 202 on the plane where the main body of the substrate film layer is located has a contour of a second regular hexagon rh2, the center of the first regular hexagon rh1 coincides with the center of the second regular hexagon rh2, a ratio of the side length a1 of the first regular hexagon rh1 to the side length a2 of the second regular hexagon rh2 is ⅘, any point on the first regular hexagon rh1 has a fixed minimum distance to the second regular hexagon rh2, and the light emitting element 5 faces a middle region of the first regular hexagon rh1. As can be seen from part (b) of FIG. 11, there are six distinct small light spots above the light emitting element 5.

As can be seen from the above, each light homogenizing structure 2 in the embodiments of the present disclosure has a function of splitting the light spot, and a function of reducing small-angle light emission (also referred to as forward light emission) from the light emitting elements for light homogenization.

Since the symmetries of the square pyramid, the triangular pyramid and the hexagonal pyramid are different, applicable arrangements of uniform light structure therefor are different, and arrangement of the corresponding light emitting elements are also different.

Figure 12A:
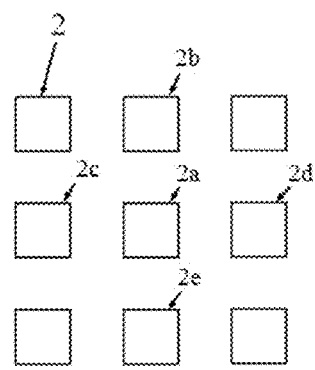
FIG. 12a is a schematic view showing an arrangement of a plurality of light homogenizing structures in the light homogenizing film when the regular pyramid shape is a square pyramid according to an embodiment of the present disclosure.

FIG. 12a is a schematic view showing arrangement of a plurality of light homogenizing structures 2 in the light homogenizing film when the regular pyramid shape is a square pyramid according to an embodiment of the present disclosure. As shown in FIG. 12a, in some embodiments, the regular pyramid shape is a square pyramid. For any one light homogenizing structure (e.g., the light homogenizing structure 2a) except the those (light homogenizing structures) located at the outermost sides of the light homogenizing film, there are four light homogenizing structures 2b, 2c, 2d, 2e (hereinafter referred to as "adjacent and nearest light homogenizing structures") adjacent and nearest to the light homogenizing structure 2a around the light homogenizing structure 2a, and the four adjacent and nearest light homogenizing structures 2b to 2e are arranged in a square shape with the light homogenizing structure 2a as the center. In other words, the plurality of light homogenizing structures 2 form a checkerboard arrangement. FIG. 12 only exemplarily shows an arrangement of nine light homogenizing structures 2 in each of which the first recess and the second recess have a size ratio $$\frac{a1}{a2} = 1.$$

Figure 12B:
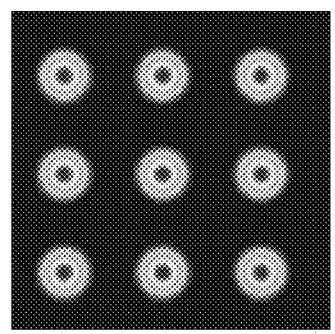
FIG. 12b is a light intensity distribution simulation diagram when light emitted from nine light emitting elements do not pass through a light homogenizing film.

FIG. 12b is a light intensity distribution simulation diagram when light emitted from nine light emitting elements does not pass through a light homogenizing film. As shown in FIG. 12b, when the light homogenizing film is not provided, nine distinct large light spots are formed above the corresponding nine light emitting elements.

Figure 12C:
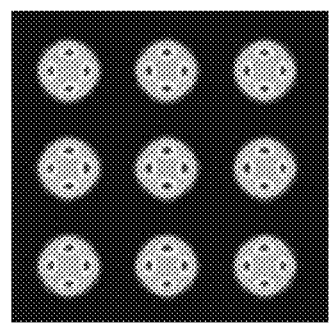

FIG. 12c is a light intensity distribution simulation diagram when light emitted from nine light emitting elements passes through the light homogenizing film shown in FIG. 12a. As shown in FIG. 12c, when the light homogenizing film as shown in FIG. 12a is provided, each light emitting element faces a corresponding light homogenizing structure, and then, 4×9=36 small light spots are present above the nine light emitting elements. As can be seen by comparing FIG. 12b and FIG. 12c, a distance between the adjacent small light spots in FIG. 12c is smaller than a distance between the adjacent large light spots in FIG. 12b. Therefore, after the light homogenizing film of the embodiments of the present disclosure is provided, the distance between adjacent light spots can be reduced, a light mixing distance subsequently required to be configured for adjacent light spots can be correspondingly reduced, and thus, the whole thickness of the backlight module can be reduced.

Figure 13A:
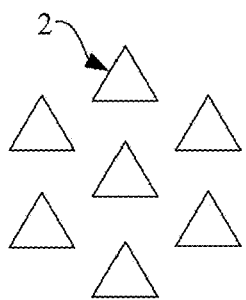
FIG. 13a is a schematic view showing an arrangement of a plurality of light homogenizing structures in the light homogenizing film when the regular pyramid shape is a regular triangular pyramid according to an embodiment of the present disclosure.

FIG. 13a is a schematic view showing arrangement of a plurality of light homogenizing structures in the light homogenizing film when the regular pyramid shape is a regular triangular pyramid according to an embodiment of the present disclosure. As shown in FIG. 13a, in some embodiments, the regular pyramid shape is a regular triangular pyramid. For any one light homogenizing structure 2 among the plurality of light homogenizing structures 2 except those located at the outermost sides of the light homogenizing film, six adjacent and nearest light homogenizing structures 2 are present around the one light homogenizing structure 2, and the six adjacent and nearest light homogenizing structures 2 are arranged in a regular hexagon shape with the one light homogenizing structure 2 as the center. In other words, the plurality of light homogenizing structures 2 form a regular triangular arrangement. FIG. 13a only exemplarily shows an arrangement of seven light homogenizing structures 2 in each of which the first recess and the second recess have a size ratio $$\frac{a1}{a2} = 1.$$

Figure 13B:
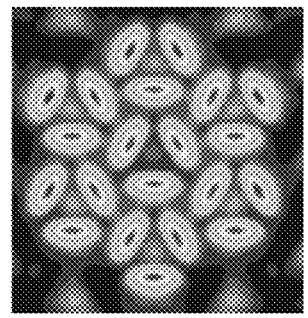

FIG. 13b is a light intensity distribution simulation diagram when light emitted from seven light emitting elements passes through the light homogenizing film shown in FIG. 13a. As shown in FIG. 13b, when the light homogenizing film as shown in FIG. 13a is provided, each light emitting element faces a corresponding light homogenizing structure, and then, 3×7=21 distinct small light spots are present above the seven light emitting elements.

Figure 14A:
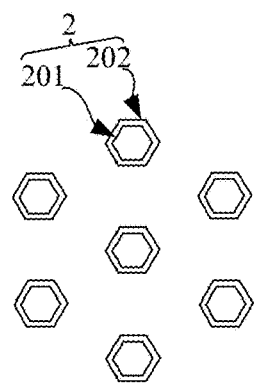
FIG. 14a is a schematic view showing an arrangement of a plurality of light homogenizing structures in the light homogenizing film when the regular pyramid shape is a regular hexagonal pyramid according to an embodiment of the present disclosure.

FIG. 14a is a schematic view showing arrangement of a plurality of light homogenizing structures in the light homogenizing film when the regular pyramid shape is a regular hexagonal pyramid according to an embodiment of the present disclosure. As shown in FIG. 14a, in some embodiments, the regular pyramid shape is a regular hexagonal pyramid. For any one light homogenizing structure 2 among the plurality of light homogenizing structures 2 except those located at the outermost sides of the light homogenizing film, six adjacent and nearest light homogenizing structures 2 are present around the one light homogenizing structure 2, and the six adjacent and nearest light homogenizing structures 2 are arranged in a regular hexagon shape with the one light homogenizing structure 2 as the center. In other words, the plurality of light homogenizing structures 2 form a regular triangular arrangement. FIG. 14a only exemplarily shows an arrangement of seven light homogenizing structures 2 in each of which the first recess 201 and the second recess 202 have a size ratio $$\frac{a1}{a2} = \frac{4}{5}.$$

Figure 14B:
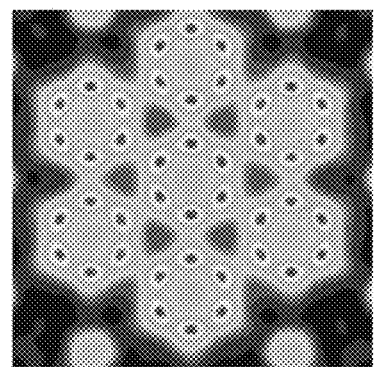

FIG. 14b is a light intensity distribution simulation diagram when light emitted from seven light emitting elements passes through the light homogenizing film shown in FIG. 14a. As shown in FIG. 14b, when the light homogenizing film as shown in FIG. 14a is provided, each light emitting element faces a corresponding light homogenizing structure, and then, 6×7=42 distinct small light spots are present above the seven light emitting elements.

In an embodiment of the present disclosure, the light homogenizing film is configured with the light homogenizing structure consisting of a first recess and a second recess both having a regular pyramid shape, thereby achieving the purpose of light homogenization. In an embodiment of the present disclosure, the first recess and the second recess may have any other regular pyramid shape other than the regular triangular pyramid, the square pyramid, and the regular hexagonal pyramid listed above, and the arrangement mode of the light homogenizing structures may also be designed and adjusted according to actual needs, which will not be enumerated here for conciseness.

Figure 15:
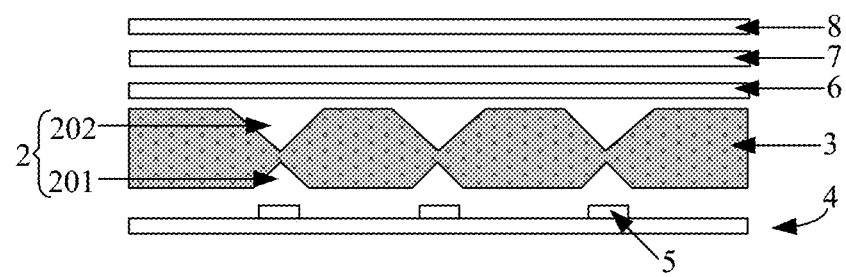
FIG. 15 is a schematic structural view of a backlight module provided in an embodiment of the present disclosure.

FIG. 15 is a schematic structural view of a backlight module provided in an embodiment of the present disclosure. As shown in FIG. 15, in an embodiment of the present disclosure, there is further provided a backlight module including the light homogenizing film 3 as provided in the above embodiments. For the specific structure of the light homogenizing film 3, reference may be made to corresponding contents in the foregoing embodiments, and details are not repeated here.

With continued reference to FIG. 15, in some embodiments, the backlight module further includes: a backlight 4 including a plurality of light emitting elements 5 arranged in an array, each of which corresponds to a unique first recess 201 and having a light emitting surface facing the corresponding first recess 201.

Figure 16:
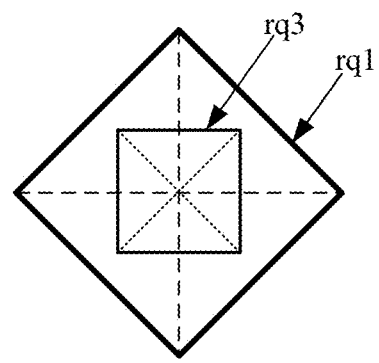
FIG. 16 is a schematic top view of a light emitting element and the light homogenizing structure opposite thereto according to an embodiment of the present disclosure.

FIG. 16 is a schematic top view of a light emitting element and the light homogenizing structure opposite thereto according to an embodiment of the present disclosure. As shown in FIG. 16, in some embodiments, the regular pyramid shape is a square pyramid, the orthographic projection of the first recess 201 on the plane where the main body of the substrate film layer is located has a contour of a first square rq1; an orthographic projection of the light emitting surface of the light emitting element 5 on the plane where the main body of the substrate film layer is located has a contour of a third square rq3, the center of the third square rq3 coincides with the center of the first square rq1; and a diagonal of the third square rq3 forms an angle of 45° with a diagonal of the first square rq1. As can be seen from the subsequent simulations, when the diagonal of the first square rq1 offsets from the diagonal of the third square rq3 by 45°, a better light homogenization effect is obtained. For more details, please refer to the following corresponding descriptions.

In some embodiments, the regular pyramid shape is a square pyramid, the orthographic projection of the first recess 201 on the plane where the main body of the substrate film layer is located has a contour of a first square rq1, an orthographic projection of the light emitting surface of the light emitting element 5 on the plane where the main body of the substrate film layer is located has a contour of a third square rq3, and the center of the third square rq3 coincides with the center of the first square rq1. For any one light emitting element 5 among the plurality of light emitting elements 5 except those located at the outermost sides of the backlight, four adjacent and nearest light emitting elements 5 are present around the one light emitting element 5, and the four adjacent and nearest light emitting elements 5 are arranged in a square shape taking the light emitting element 5 as a center. For any one light homogenizing structure 2 among the plurality of light homogenizing structures 2 except those located at the outermost sides of the light homogenizing film, four adjacent and nearest light homogenizing structures 2 are present around the one light homogenizing structure 2, and the four adjacent and nearest light homogenizing structures 2 are arranged in a square shape with the one light homogenizing structure 2 as the center. If a distance between two adjacent and nearest light emitting elements 5 is defined as P, a distance between two adjacent and nearest light homogenizing structures 2 is P, $$\frac{\sqrt{2}}{2}P \text{ or } \frac{\sqrt{2}}{4}P.$$

The corresponding description will be given below with reference to the accompanying drawings.

It should be noted that the distance between two structures described in the present disclosure specifically refers to a distance between center points of the two structures.

Figure 17:
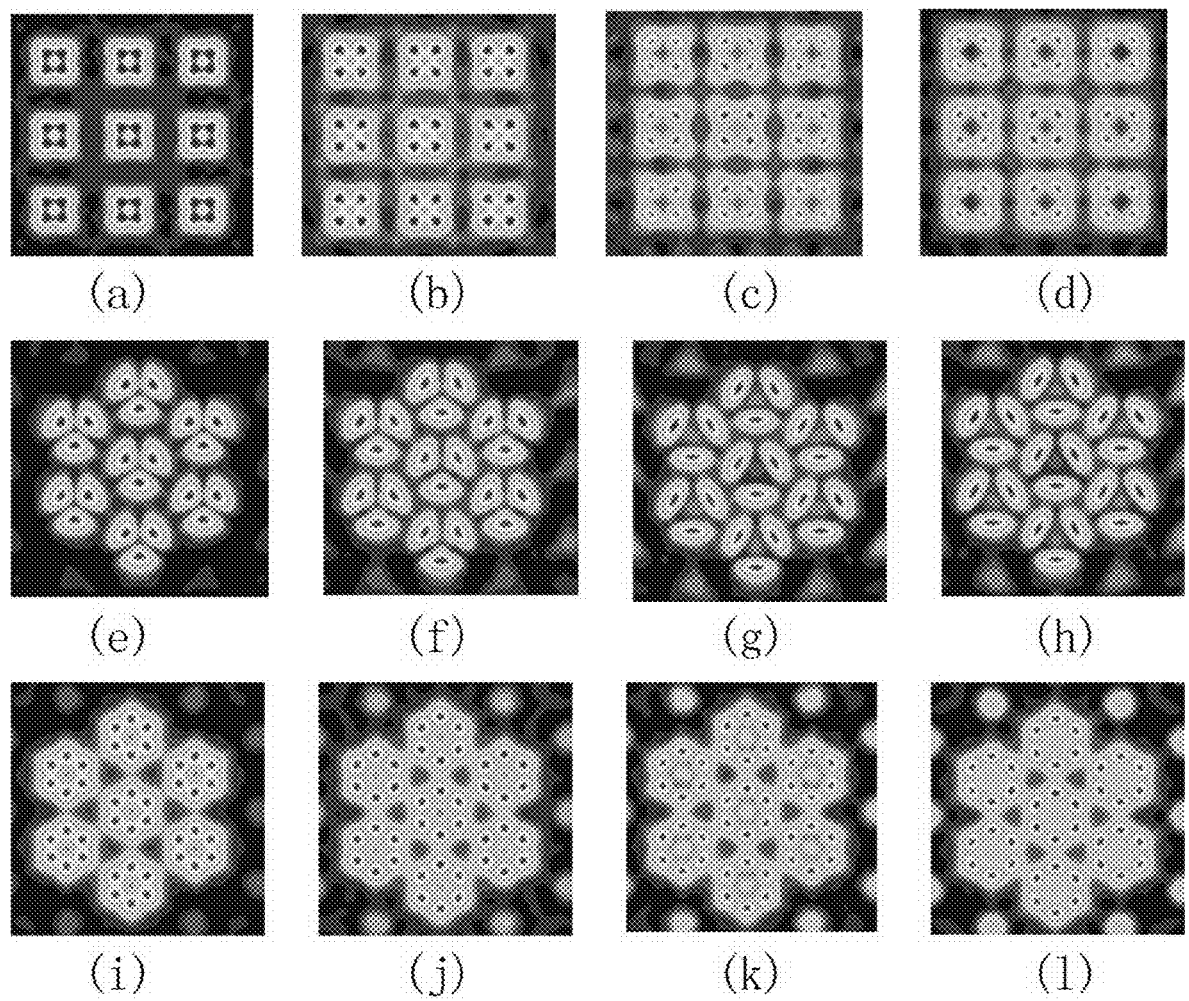
FIG. 17 shows light intensity distribution simulation diagrams when light emitted from a plurality of light emitting elements passes through the light homogenizing film according to some embodiments of the present disclosure.

FIG. 17 shows light intensity distribution simulation diagrams when light emitted from a plurality of light emitting elements passes through the light homogenizing film according to some embodiments of the present disclosure. As shown in FIG. 17, a side surface and a bottom surface of the regular pyramid corresponding to the first recess form an angle α (hereafter "angle corresponding to the first recess"), and a side surface and a bottom surface of the regular pyramid corresponding to the second recess form an angle β (hereafter "angle corresponding to the second recess"). In parts (a) to (d) of FIG. 17, the first recess and the second recess each have a square pyramid shape, and a size ratio of the first recess to the second recess is 1; in parts (e) to (h) of FIG. 17, the first recess and the second recess each have a regular triangular pyramid shape, and a size ratio of the first recess to the second recess is 1; and in parts (i) to (l) of FIG. 17, the first recess and the second recess each have a regular hexagonal pyramid shape, and a size ratio of the first recess to the second recess is 1. Further, in parts (a), (e) and (i), α=45° and β=10°; in parts (b), (f) and (j), α=45° and β=20°;

in parts (c), (g) and (k), α=45° and β=30°; and in parts (d), (h) and (l), α=45° and β=40°.

As can be seen from the light intensity distribution simulation diagrams in FIG. 17, under the condition that the shapes and the size ratio of the first recess 201 and the second recess 202, as well as the angle α corresponding to the first recess 201 are given, the light spots become more dispersed as the angle β corresponding to the second recess 202 increases. Therefore, the angle β corresponding to the second recess 202 may take a value as large as possible in the actual design process.

Figure 18:
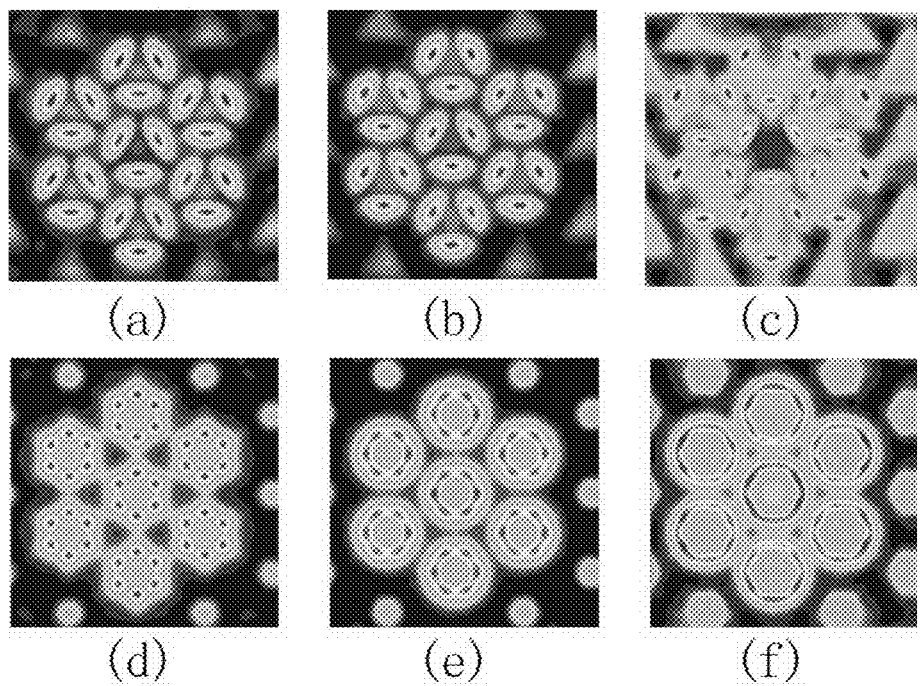
FIG. 18 shows light intensity distribution simulation diagrams when light emitted from a plurality of light emitting elements passes through the light homogenizing film according to an embodiment of the present disclosure.

FIG. 18 shows light intensity distribution simulation diagrams when light emitted from a plurality of light emitting elements passes through the light homogenizing film according to some embodiments of the present disclosure. As shown in FIG. 18, the angle α corresponding to the first recess is 45°, and the angle β corresponding to the second recess is 40°. In parts (a) to (c) of FIG. 18, the first recess and the second recess each have a regular triangular pyramid shape, and in part (a), a size ratio of the first recess to the second recess is 1:1; in part (b), a size ratio of the first recess to the second recess is 1:2; and in part (c), a size ratio of the first recess to the second recess is 1:3. In parts (d) to (f) of FIG. 18, the first recess and the second recess each have a regular hexagonal pyramid shape, in part (d), a size ratio of the first recess to the second recess is 1; in part (e), a size ratio of the first recess to the second recess is ½; and in part (f), a size ratio of the first recess to the second recess is ⅓.

As can be seen from the simulation results shown in FIG. 18, under the condition that the shapes and the corresponding angles of the first recess and the second recess are given, the split light spots are more disordered as the size ratio of the first recess to the second recess becomes smaller, which is not beneficial to the subsequent light mixing regulation of the light spots.

With continued reference to FIG. 15, in some embodiments, the backlight module further includes: at least one of a diffusion film 6, a quantum dot film 7 and a prism film 8 positioned on the light emitting surface side of the light homogenizing film. FIG. 15 exemplarily shows a case where the diffusion film 6, the quantum dot film 7, and the prism film 8 are simultaneously provided in the backlight module. The diffusion film 6, the quantum dot film 7 and the prism film 8 can effectively mix light spots to improve the uniformity of light emitted from the backlight module. For convenience of description, a structure formed by the stacked diffusion film 6, quantum dot film 7 and prism film 8 is referred to as an optical film layer structure.

Figure 19A:
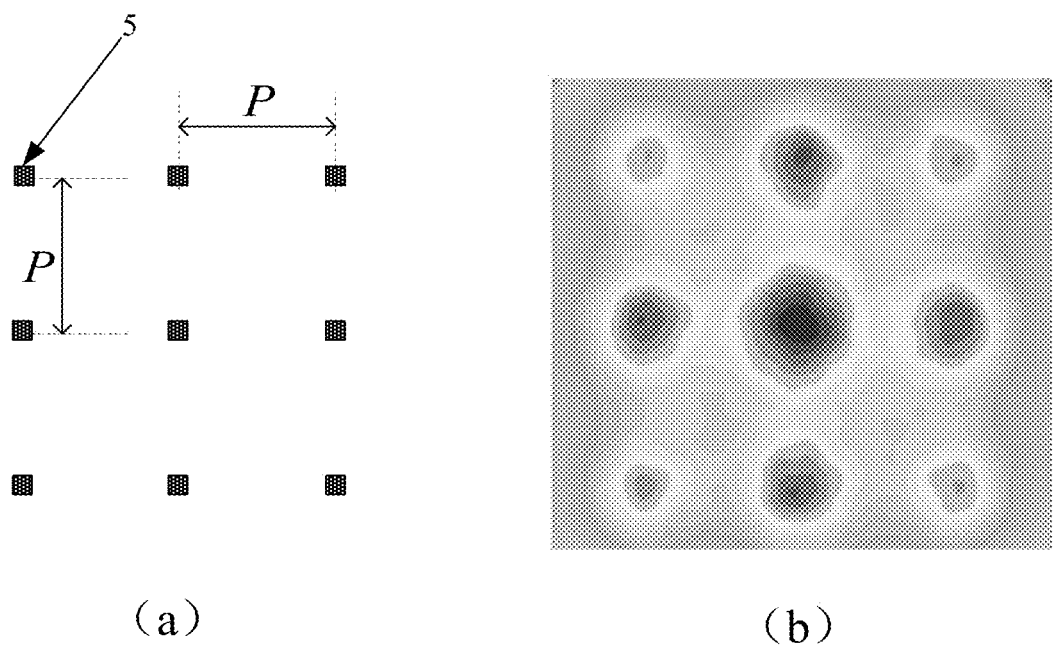
FIG. 19a shows a schematic top view and a light intensity distribution simulation diagram when the light emitted from nine light emitting elements passes through an optical film layer structure without a light homogenizing film.

FIG. 19a shows a schematic top view and a light intensity distribution simulation diagram when light emitted from nine light emitting elements passes through an optical film layer structure without a light homogenizing film. As can be seen from part (a) of FIG. 19a, nine light emitting elements 5 are arranged in an array. Two adjacent and nearest light emitting elements 5 have a distance P therebetween, that is, two adjacent light emitting elements 5 in the shown row direction have a distance P therebetween, and two adjacent light emitting elements 5 in the shown column direction have a distance P therebetween. As can be seen from part (b) of FIG. 19a, nine large light spots are located above the nine light emitting elements 5, and the center light spot is brighter and larger than the rest eight surrounding light spots.

Figure 19B:
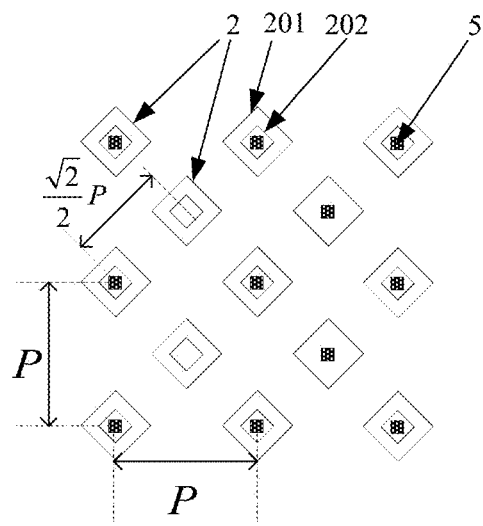
FIG. 19b shows a schematic top view and a light intensity distribution simulation diagram when the light emitted from nine light emitting elements passes through an optical film layer structure provided with a light homogenizing film and a distance between adjacent light homogenizing structures is $$\frac{\sqrt{2}}{2}P;$$
Figure 19B:
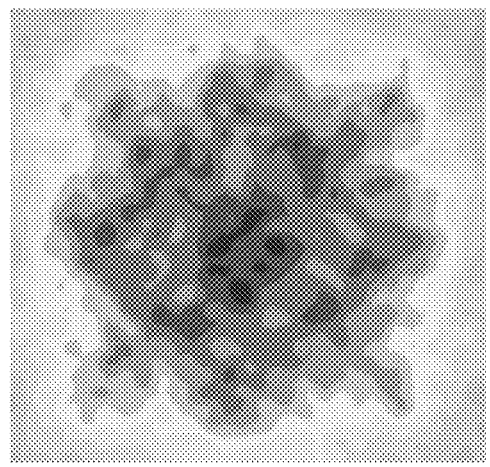
Figure 19C:
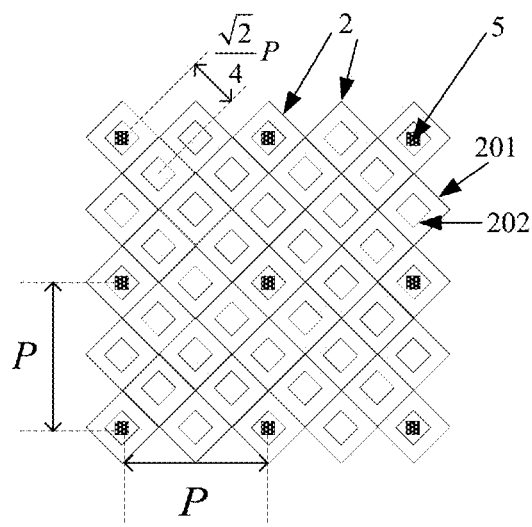
FIG. 19c shows a schematic top view and a light intensity distribution simulation diagram when the light emitted from nine light emitting elements passes through an optical film layer structure provided with a light homogenizing film and a distance between adjacent light homogenizing structures is $$\frac{\sqrt{2}}{4}P;$$
Figure 19C:
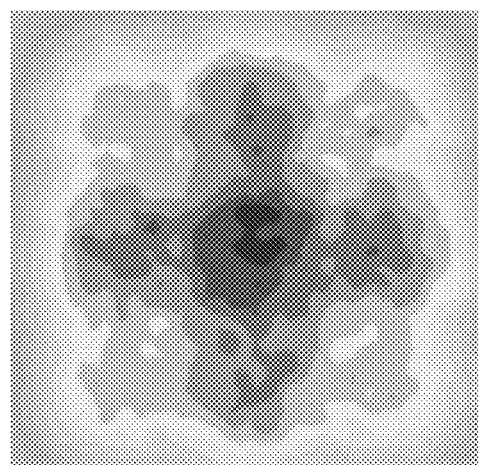

FIG. 19b shows a schematic top view and a light intensity distribution simulation diagram when the light emitted from nine light emitting elements passes through an optical film layer structure provided with a light homogenizing film and a distance $$\frac{\sqrt{2}}{2}P$$

between adjacent light homogenizing structures, and FIG. 19c shows a schematic top view and a light intensity distribution simulation diagram when the light emitted from nine light emitting elements passes through an optical film layer structure provided with a light homogenizing film and a distance $$\frac{\sqrt{2}}{4}P$$

between adjacent light homogenizing structures. As shown in FIGS. 19b and 19c, the first recess 201 and the second recess 202 each have a square pyramid shape, and a size ratio of the first recess 201 to the second recess 202 is ½. An orthographic projection of the light emitting surface of the light emitting element 5 on the plane where the main body of the substrate film layer is located has a contour of a third square. The center of the third square coincides with the center of the first square, and a diagonal of the third square forms an angle of 45° with a diagonal of the first square. As can be seen from part (a) of FIG. 19b, the nine light emitting elements are arranged in a manner similar to that in part (a) of FIG. 19a, two adjacent and nearest light emitting elements 5 have a distance P therebetween, and two adjacent and nearest light homogenizing structures 2 have a distance $$\frac{\sqrt{2}}{2}P.$$

As can be seen from part (a) of FIG. 19c, the nine light emitting elements are arranged in a manner similar to that in part (a) of FIG. 19a, two adjacent and nearest light emitting elements 5 have a distance P therebetween, and two adjacent and nearest light homogenizing structures 2 have a distance $$\frac{\sqrt{2}}{4}P.$$

As can be seen by comparing the light intensity distribution simulations in part (b) in FIG. 19b, part (b) in FIG. 19c and part (b) in FIG. 19a, after the light homogenizing film of the embodiments of the present disclosure is provided, the overall light emitting uniformity of the backlight module are notably improved. In addition, when two adjacent and nearest light emitting elements 5 have a distance P therebetween, the arrangement mode of the light homogenizing structures 2 shown in FIG. 19b results in better overall brightness and uniformity of the light emitted from the backlight module compared with the arrangement mode in FIG. 20.

Figure 20A:
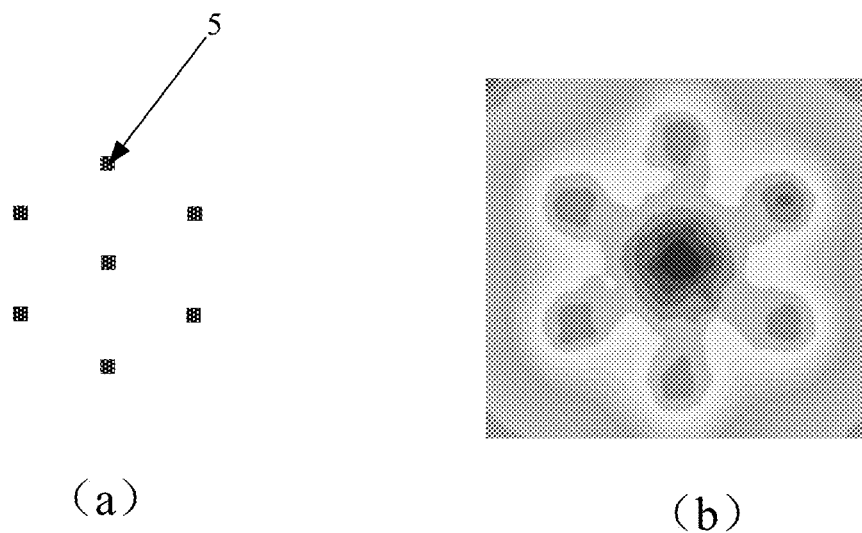
FIG. 20a shows a schematic top view and a light intensity distribution simulation diagram when the light emitted from seven light emitting elements passes through an optical film layer structure without a light homogenizing film.

FIG. 20a shows a schematic top view and a light intensity distribution simulation diagram when light emitted from seven light emitting elements passes through an optical film layer structure without a light homogenizing film. As can be seen from part (a) of FIG. 20a, there are six adjacent light emitting elements 5 around the center light emitting element 5, and the six adjacent light emitting elements 5 are arranged in a regular hexagon shape and have the same distance to the center light emitting element 5. Specifically, in the column direction, two adjacent light emitting elements 5 are located in the n−1th row and the n+1th row, respectively; and in the row direction, two adjacent light emitting elements 5 are located in the m−1th column and the m+1th column, respectively, where each of n and m is a integer greater than 1. As can be seen from part (b) of FIG. 20a, seven large light spots are located above the seven light emitting elements 5, and the center light spot is brighter and larger than the other surrounding six light spots.

Figure 20B:
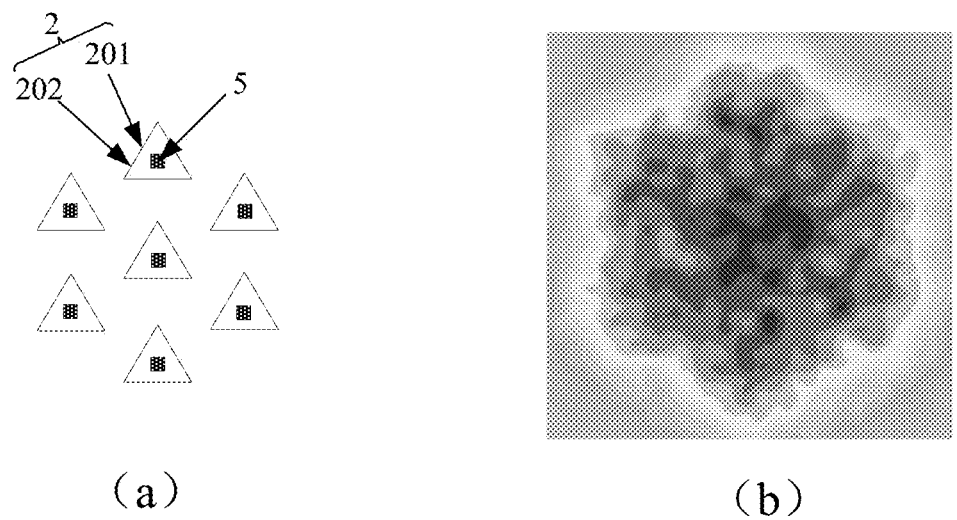
FIG. 20b shows a schematic top view and a light intensity distribution simulation diagram when the light emitted from seven light emitting elements passes through an optical film layer structure provided with a light homogenizing film and the first and second recesses are regular triangular pyramids.
Figure 20C:
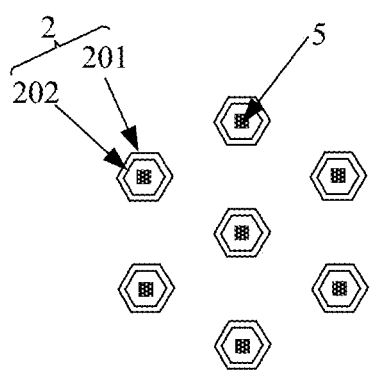
FIG. 20c shows a schematic top view and a light intensity distribution simulation diagram when the light emitted from seven light emitting elements passes through an optical film layer structure provided with a light homogenizing film and the first and second recesses being regular triangular pyramids.
Figure 20C:
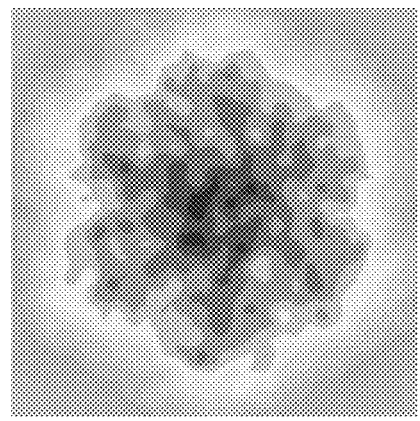

FIG. 20b shows a schematic top view and a light intensity distribution simulation diagram when the light emitted from seven light emitting elements passes through an optical film layer structure provided with a light homogenizing film and the first and second recesses being regular triangular pyramids; and FIG. 20c shows a schematic top view and a light intensity distribution simulation diagram when the light emitted from seven light emitting elements 5 passes through an optical film layer structure provided with a light homogenizing film and the first and second recesses being regular triangular pyramids. As can be seen from part (a) in FIG. 20b and part (a) in FIG. 20c, there are six adjacent light homogenizing structures 2 located around a center light homogenizing structure 2, the seven light homogenizing structures 2 correspond to the seven light emitting elements 5 one by one.

As can be seen by comparing the light intensity distribution simulations in part (b) in FIG. 20b, part (b) in FIG. 20c and part (b) in FIG. 20a, after the light homogenizing film of the embodiments of the present disclosure is provided, the overall light emitting uniformity of the backlight module are notably improved.

As can be seen from the above, by adding the light homogenizing film of the embodiments of the present disclosure into the backlight module, the overall light emitting brightness and uniformity of the backlight module are effectively improved.

In an embodiment of the present disclosure, there is further provided a display device which includes the backlight module provided in the above embodiments of the present disclosure. For the specific description of the backlight module, reference may be made to corresponding contents in the foregoing embodiments, and details are not repeated here.

It will be appreciated that the above implementations are merely exemplary implementations for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A light homogenizing film, comprising:
a substrate film layer on which a plurality of light homogenizing structures are arranged in an array, the light homogenizing structure comprising:
a first recess positioned on a light incident surface of the substrate film layer, and a second recess positioned on a light emitting surface of the substrate film layer opposite to the light incident surface,
wherein the first recess and the second recess each have a regular pyramid shape, an orthographic projection of the second recess on a plane where a main body of the substrate film layer is located completely covers an orthographic projection of the first recess on the plane where the main body of the substrate film layer is located, the orthographic projection of the first recess on the plane where the main body of the substrate film layer is located has a contour of a first regular polygon, the orthographic projection of the second recess on the plane where the main body of the substrate film layer is located has a contour of a second regular polygon, the first regular polygon and the second regular polygon have the same number of sides, a center of the first regular polygon coincides with a center of the second regular polygon, and any point on the first regular polygon has the same minimum distance to the second regular polygon, wherein
the regular pyramid shape is a regular triangular pyramid or a regular hexagonal pyramid; and for any one light homogenizing structure among the plurality of light homogenizing structures except those located at the outermost sides of the light homogenizing film, six light homogenizing structures, which are adjacent and nearest to the one light homogenizing structure, are present around the one light homogenizing structure and arranged in a regular hexagon shape taking the one light homogenizing structure as a center, or
the regular pyramid shape is a square pyramid; and for any one light homogenizing structure among the plurality of light homogenizing structures except those located at the outermost sides of the light homogenizing film, four light homogenizing structures, which are adjacent and nearest to the one light homogenizing structure, are present around the one light homogenizing structure and arranged in a square shape taking the one light homogenizing structure as a center.

2. The light homogenizing film according to claim 1, wherein a side surface and a bottom surface of the regular pyramid corresponding to the first recess form an angle $\alpha$, a side surface and a bottom surface of the regular pyramid corresponding to the second recess form an angle $\beta$, and $\alpha$ and $\beta$ satisfy:

$$\begin{cases} \alpha + \beta - \arcsin\frac{\sin(\theta 1 + \alpha)}{n} > \arcsin\frac{1}{n} \\ \pi - \alpha - 2\beta + \arcsin\frac{\sin(\theta 1 + \alpha)}{n} > \arcsin\frac{1}{n} \end{cases}$$

wherein n is a refractive index of the substrate film layer, $\theta 1$ is a preset dimming angle, and $0° \leq \theta 1 \leq 30°$.

3. The light homogenizing film according to claim 1, wherein the first regular polygon has a side length a1, the second regular polygon has a side length a2, and a1 and a2 satisfy:

$$\frac{1}{3} \leq \frac{a1}{a2} \leq 1.$$

4. The light homogenizing film according to claim 1, wherein a material of the substrate film comprises at least one selected from a group consisting of: polycarbonate, polyethylene terephthalate, polymethyl methacrylate, and glass.

5. A backlight module, comprising: the light homogenizing film as claimed in claim 1.

6. The backlight module according to claim 5, further comprising: a backlight, wherein the backlight comprises a plurality of light emitting elements arranged in an array, each of the plurality of light emitting elements corresponding to a different first recess and having a light emitting surface facing the corresponding first recess.

7. The backlight module according to claim 6, wherein
in a case where the regular pyramid shape is a square pyramid, the orthographic projection of the first recess on the plane where the main body of the substrate film layer is located has a contour of a first square;
an orthographic projection of the light emitting surface of the light emitting element on the plane where the main body of the substrate film layer is located has a contour of a second square, wherein a center of the second square coincides with a center of the first square; and
a diagonal of the second square forms an angle of 45° with a diagonal of the first square.

8. The backlight module according to claim 6, wherein
in a case where the regular pyramid shape is a square pyramid, the orthographic projection of the first recess on the plane where the main body of the substrate film layer is located has a contour of a first square, an orthographic projection of the light emitting surface of the light emitting element on the plane where the main body of the substrate film layer is located has a contour of a second square, wherein a center of the second square coincides with a center of the first square;
for any one light emitting element among the plurality of light emitting elements except those located at the outermost sides of the backlight, four light emitting elements, which are adjacent and nearest to the one light emitting element, are present around the one light emitting element, and arranged in a square shape taking the one light emitting element as a center;
for any one light homogenizing structure among the plurality of light homogenizing structures except those located at the outermost sides of the light homogenizing film, four light homogenizing structures, which are adjacent and nearest to the one light homogenizing structure, are present around the one light homogenizing structure, and arranged in a square shape taking the one light homogenizing structure as a center; and
when a distance between two adjacent and nearest light emitting elements is P, a distance between two adjacent and nearest light homogenizing structures is P, $$\frac{\sqrt{2}}{2}P \text{ or } \frac{\sqrt{2}}{4}P.$$

9. The backlight module according to claim 7, wherein
for any one light emitting element among the plurality of light emitting elements except those located at the outermost sides of the backlight, four light emitting elements, which are adjacent and nearest to the one light emitting element, are present around the one light emitting element, and arranged in a square shape taking the one light emitting element as a center;
for any one light homogenizing structure among the plurality of light homogenizing structures except those located at the outermost sides of the light homogenizing film, four light homogenizing structures, which are adjacent and nearest to the one light homogenizing structure, are present around the one light homogenizing structure, and arranged in a square shape taking the one light homogenizing structure as a center; and
when a distance between two adjacent and nearest light emitting elements is P, a distance between two adjacent and nearest light homogenizing structures is P, $$\frac{\sqrt{2}}{2}P \text{ or } \frac{\sqrt{2}}{4}P.$$

10. The backlight module according to claim 5, further comprising: at least one of a diffusion film, a quantum dot film and a prism film positioned on the light emitting surface side of the light homogenizing film.

11. A display device, comprising the backlight module as claimed in claim 5.

* * * * *